Oct. 21, 1958

R. GOERLICH ET AL 2,857,059

DEVICE FOR STORING SWITCHING INFORMATION
FOR CONTROLLING OPERATIONS OF
CONVEYING SYSTEMS

Filed July 20, 1954

Inventors:
Reinhard Goerlich
Manfred Müller by R P Morris
Attorney

Inventors:
Reinhard Goerlich
Manfred Müller

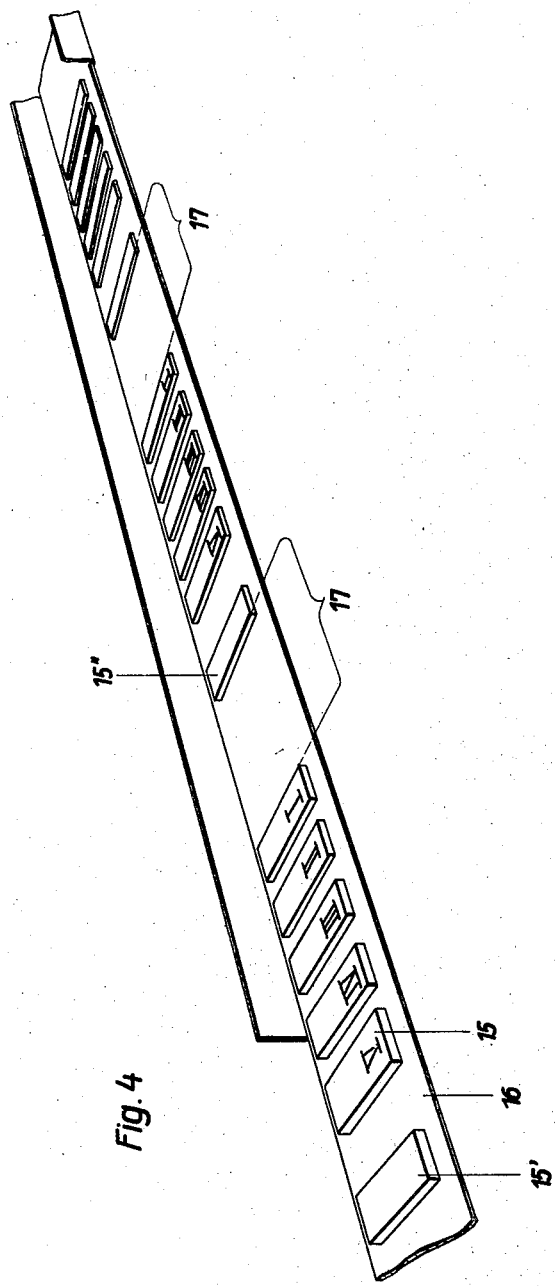

Oct. 21, 1958  R. GOERLICH ET AL  2,857,059
DEVICE FOR STORING SWITCHING INFORMATION
FOR CONTROLLING OPERATIONS OF
CONVEYING SYSTEMS
Filed July 20, 1954  6 Sheets-Sheet 4

Inventors:
Reinhard Goerlich
Manfred Müller by  *R.P. Morris*
Attorney

Oct. 21, 1958
R. GOERLICH ET AL
2,857,059
DEVICE FOR STORING SWITCHING INFORMATION
FOR CONTROLLING OPERATIONS OF
CONVEYING SYSTEMS
Filed July 20, 1954
6 Sheets-Sheet 5
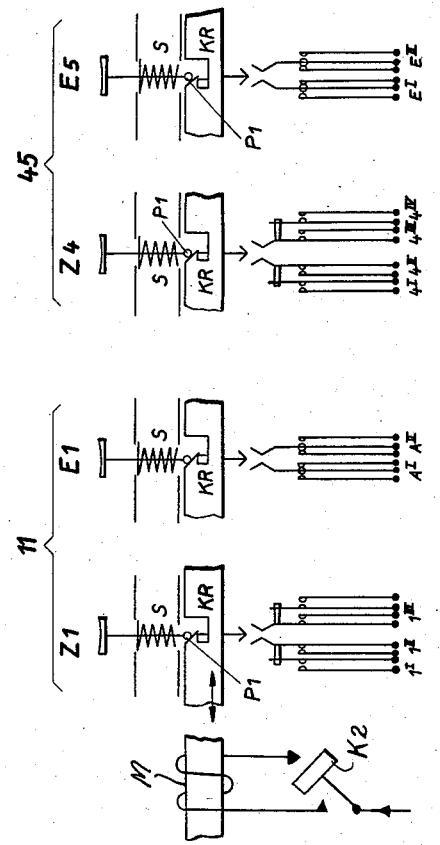
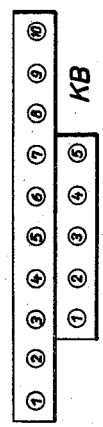
Inventors:
Reinhard Goerlich
Manfred Müller
by
Attorney

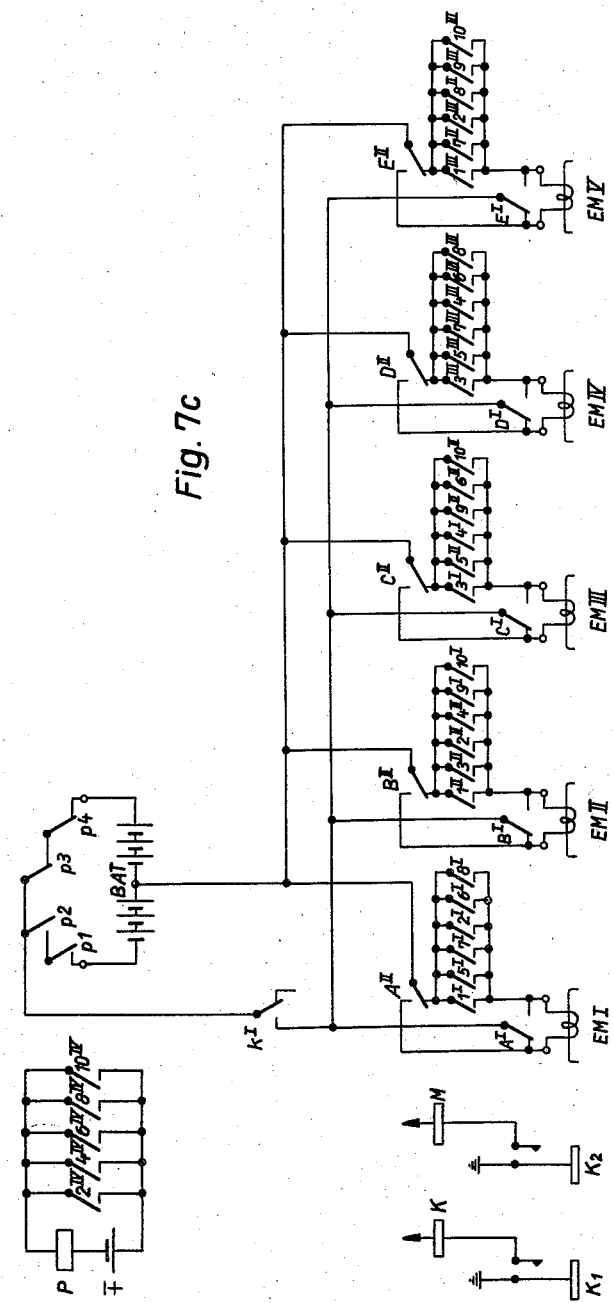

United States Patent Office 2,857,059
Patented Oct. 21, 1958

2,857,059

DEVICE FOR STORING SWITCHING INFORMATION FOR CONTROLLING OPERATIONS OF CONVEYING SYSTEMS

Reinhard Goerlich, Berlin-Schoneberg, and Manfred Muller, Berlin, Germany, assignors to International Standard Electric Corporation, New York, N. Y., a corporation of Delaware Application July 20, 1954, Serial No. 444,584

Claims priority, application Germany July 31, 1953

15 Claims. (Cl. 214—11)

This invention relates to storage systems and more particularly to a device for magnetically storing switching information whereby to control the operation of conveying systems.

In systems for the distribution of goods, conveyor belts are often used to convey the goods to one of several possible destinations as determined by a control position usually at the beginning of the conveyor belt run. The control position provides for the adjustment of movable cams or pins and which characteristic movement stores the information relating to the destination to which goods on the belt are to be ultimately transported. The prior art as represented by the movable setting elements was deficient in that the parts would wear out from the constant setting and unsetting.

The prior art also utilized perforated tapes for the storage of switching information, perforations providing a register of the information concerning a destination. Tapes, however, wore out and this disadvantage led to the introduction of electromagnetic storage systems wherein there were no moving tapes nor physically settable elements such as cams or pins. Conveyor belts are known having a magnetizable layer of metal thereon and in which metal the switching information could be stored magnetically. Due to the fact that the belts contained a very thin layer of magnetic material, no strong flux could be developed thereon and necessitated the employment of electron scanning to amplify signals derived from the magnetically stored information on the belt.

The magnetic belt was required to be in closed proximity to the reading device and sometimes heavy loads caused the belt to become distorted with respect to the reading device thereby causing possible error. The prior art taught that a steel wire or tape may rotate synchronously with the conveyor belt but in such a case, the possibility that the belt and the wire or tape may become asynchronous was ever present.

The present invention relates to a device for registering switching information in conveying systems in which the switching information is stored in storage means mounted at certain intervals along the belt and which means magnetically stores the information and which can be differently magnetized with respect to its polarity from a central control position and that disposed along the path of the conveyor belt a plurality of switches are provided having permanent magnets associated with their movable elements and which magnets are in proximity to the conveyor belt and which magnets are adapted to be acted upon by the several magnetic storage elements on the belt thereby selectively actuating the switch contacts associated with said switches in accordance with the polarization of the said magnetic storage elements on said belt. One of the advantages to be obtained from such an organization is the direct conversion of the stored switching information to directly operate the switch contacts without requiring any intermediate elements or amplifiers.

According to another feature of the invention, the magnetization of the storage means is effected in such a manner that the magnetic polarity of the storage means extends transverse to the direction of movement of the conveying means. According to another feature of the invention, the switches controlling the operation of the conveying system are provided with a permanent magnet whose polarity extends transverse to the direction of movement of the conveying means.

Another feature of the invention resides in the provision of a plurality of magnetic storage elements which are magnetized according to a certain code for controlling a predetermined switching operation. The evaluation of the stored information will be effected by means of a plurality of contacting devices corresponding in number to said storage elements. This invention operates on the basis that when storing a switching order, a basic code is set up in the storage elements. This basic code will be modified according to the desired destination and according to a further aspect of the invention further storage means may be interconnected to the contacting devices for identifying or determining the destination stored.

A more thorough understanding of the present invention may be had of the following detailed description and the accompanying drawing in which:

Fig. 4 shows the arrangement of the storage elements on the conveyor belt for the formation of a code;

Figure 5:
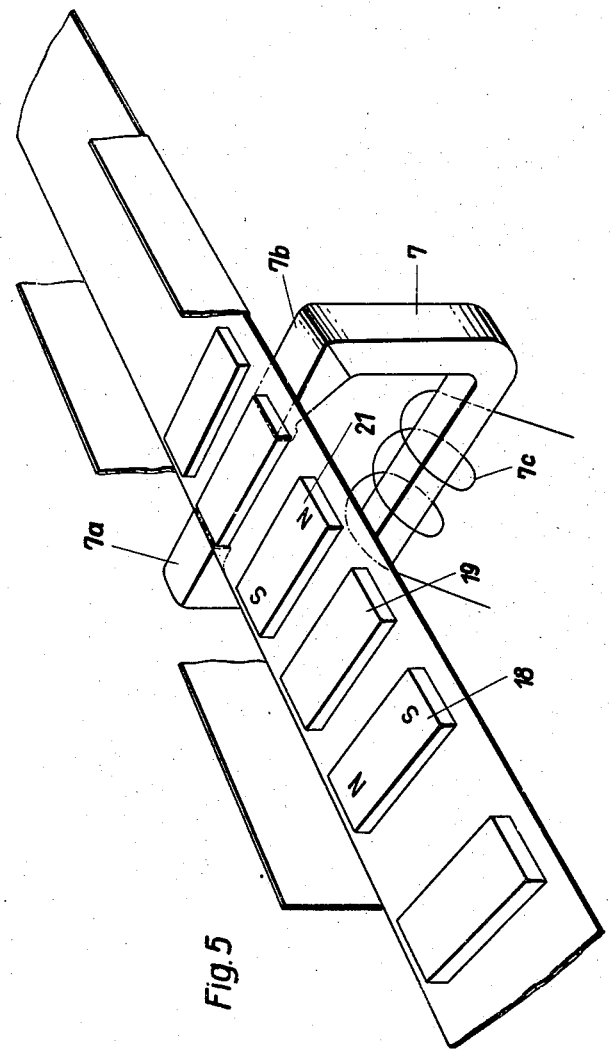
Fig. 5 shows the arrangement of the recording devices for selectively magnetizing the storage elements on the conveyor belt.

Fig. 7a schematically shows two sets of keys associated with a keyboard at the control position;

Fig. 7b shows schematically certain of the keys shown in Fig. 7a and the contacts controlled thereby;

Fig. 7c is a schematic circuit diagram for selectively magnetizing the storage elements on the conveyor belt shown in Figs. 4 and 5.

Figure 1:
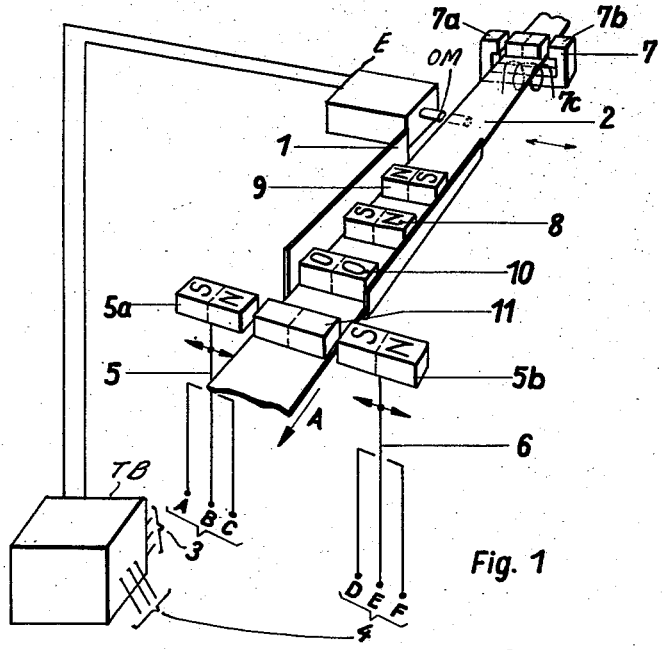
Fig. 1 shows the principle of the disposition of the magnetic storage elements on the conveyor belt together with the magnetic recording device and the switching devices.

Referring now to Fig. 1, there is shown schematically a U-shaped guide 1 between the arms of which a conveyor belt 2 is adapted to move in the direction indicated by the arrow A. Mounted on the belt 2 there are positioned the storage elements in the shape of magnetic steel blocks 8, 9, 10, each spaced from the other. The magnetic polar condition of the blocks 8, 9, 10 is indicated by the letters N, S, or O; N representing north pole, S representing south pole and O representing no magnetic polarity. The element 11 is made of soft iron and is incapable of retaining any magnetic polarity. Adjacent to the belt 2 there are provided two scanning contact spring assemblies 3 and 4, disposed on opposite sides of the belt 2. The contact spring assembly 3 is provided with a center spring 5 to the free end of which is attached a permanent magnet 5a having the polarity indicated in the drawing. The center spring 5 is adapted to move in either direction indicated by the pair of arrows attached thereto, which direction is transverse to the direction of movement of the belt 2. The contact spring assembly 4 is provided with a center spring 6 and a permanent magnet 5b and operates in a similar manner to the contact spring assembly 3, the difference being in the relative polarity of the magnet 5b with respect to the storage elements carried by the belt 2. The magnet 5a has its north pole nearest one side of the belt 2 and the magnet 5b has its south pole nearest the belt 2. There is further shown, a magnetic recording device 7 which device is in proximity of the belt 2 and whose pole pieces 7a and 7b are adapted to assume north or south polarity depending upon the direction of the current flow through the associated winding 7c. As steel blocks 8, 9, 10 are in alignment with the pole pieces 7a and 7b, the magnetic polarity of the blocks may be changed by the control of the direction of the current flow through the winding 7c. It will be understood that the winding 7c is selectively controlled by means (not shown) from the central operating position. Also there are a plurality of recording devices 7 depending on the number of storage elements to be simultaneously magnetized.

The operation of the device is such that upon movement of the belt 2 in the direction of the arrow A, the storage element 8 assumes a position in alignment with magnets 5a and 5b. Both the movable center springs 5 and 6 associated with the spring assemblies 3, 4, respectively, will be attracted in a direction toward the belt thereby to complete a contact between contacts B and C, D and E, respectively, by reason of the fact that the north pole of magnet 5a will be attracted to the south pole of storage element 8 and similarly the south pole of magnet 5b will be attracted to the north pole of the storage element 8. Should the storage element 9 be moved in alignment with magnets 5a and 5b, however, magnet 5a will be repelled from the block 9 and contacts A and B of the spring assembly 3 will make and contacts E and F of the spring assembly 4 will similarly make because the north pole of storage element 9 will repel the north pole of magnet 5a and the south pole of storage element 9 will repel the south pole of magnet 5b. Thus far, two possible conditions have been described. Block 10 having no magnetic polarity as indicated by the zeros, 0—0 will not influence the permanent magnets 5a and 5b since it possesses a relatively high degree of magnetic reluctance. Block 11 on the other hand, being made of soft iron possesses a high degree of permeability and the flux from the magnet 5a will readily pass through block 11 to the magnet 5b thereby attracting both magnets in a direction toward the belt 2 and consequently causing a closure of the contacts BC and DE, respectively.

Thus the magnets 5a and 5b will operate contacts which complete an electrical circuit to the terminal box TB to operate a suitable ejection device E and which device is positioned alongside the belt 2. The ejection device E is provided with a suitable operating member OM and which member is adapted to be selectively operated across the top surface of the belt in a direction transverse to the movement of said belt and in the direction indicated by the arrow. Any article carried by the belt would thereby be ejected from the belt by the operating member OM to a suitable receptacle (not shown). Since the terminal box and the ejection device E are elements which are well known in the art and which form no part of this invention, they are not further disclosed. It will be understood, however, that there may be a plurality of ejection devices E disposed along the length of the belt 2 at different positions and which further devices may be under control of different detecting devices similarly situated along the run of the belt.

Figure 2:
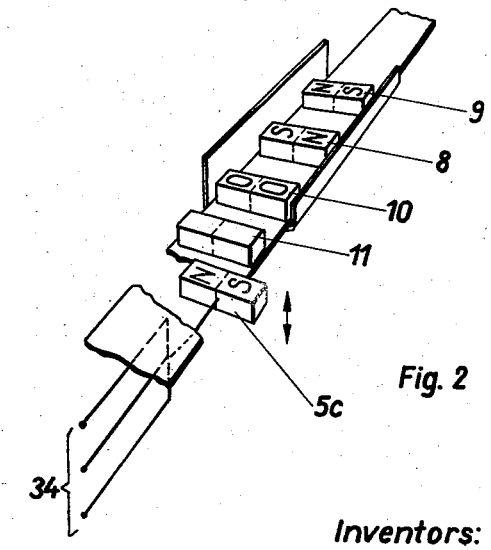
Fig. 2 shows a modification of the structure of Fig. 1 with the switching device arranged in a different position with respect to the conveyor belt.

Fig. 2 is a modification of the utilization device 34. In this figure, the permanent magnet 5c which is attached to the center spring of the contact set 34, is placed directly beneath the moving belt 2 with the polarity of the magnet again transverse to the direction of movement of the belt. It will be understood that the center spring of the set 34 must be pretensioned to normally maintain the permanent magnet 5c in the position shown and the movable contact intermediate the fixed contacts as shown. In this embodiment, the permanent magnet 5c will move vertically with respect to the belt in the direction of the arrows. One of the advantages to be realized from the embodiment shown in Fig. 2 is that the magnetic detecting device is beneath the belt and is not likely to be accidentally struck or touched either by goods carried on the belt or by personnel.

The possibilities of storing the switching or control information are limited by the number of different magnetized conditions of the storage elements arranged along the conveyor belt, the number of elements of a code being the limiting factor as will be understood. It has been found, however, that the number of elements may be reduced by providing a unique circuit for forming different codes with a limited number of elements by the expedient of selectively reversing magnetic polarity. Accordingly, the destination identification information is converted into code signals with a minimum number of keys to be operated at the control position. To better understand the basis for the operation of the system utilized, reference should now be made to Fig. 3 which is a schematic representation of fifty possible switching orders and which in the case of the conveyor belt described may represent fifty different destination points to which goods carried by the conveyor belt may be selectively routed. It will be noted in Fig. 3, that the fifty destinations are in ten groups of five each, the first group consisting of destinations 11—15, the second group consisting of 21—25, and the tenth group consisting of destinations 01—05. It will be understood that each of the multiples 11—15, etc. are connected to some switching device (not shown) associated with a different destination receptacle (not shown) along the path of travel of the belt. The block numbered 12 schematically indicates the control center and the reference numeral 13 indicates the common conductor interconnecting the control station with the several multiples 11—15, etc.

In accordance with the usual decadic destination, it will be assumed that to the first branch of multiple 14, there will be allotted the basic identification 10 and to the individual multiples thereof the numbers 1 to 5, so that accordingly, the designation of the first five multiples branching out of the main channel 13 is fixed by the numbers 11 . . . 15. In similar manner, the designation of the successive groups of multiples is made, it being obvious that the tens digit will determine to which group the signal is destined and the units digit to further select which multiple of the group is involved.

In order to enable the use of a relatively simple coding device, reference should now be made to Fig. 4 where there is shown schematically a conveyor belt with groups of magnetic blocks 15 provided with the marking I . . . V, each of which elements of a group are identically spaced. Each group includes a further block 15', which corresponds to the soft iron block 11 shown in Fig. 1. It will be noted from an examination of Fig. 4, that the spacing between block 15' and block V is greater than the spacing between the several blocks of the group. It will be further noted that the spacing between block I of one group and block 15'' of the second group is greater than the spacing between blocks of the same group. The goods to be transported by the belt 16 may be deposited in the space 17 for physical conveyance to the proper destination. It will be understood that by selectively magnetizing the blocks I . . . V any suitable code corresponding to the place of destination may be stored thereon. Fig. 5 shows one of the recording devices 7 in position to magnetize one of the five blocks, numbers V, IV, and III of which are indicated as 18, 19, and 21. The formation of the code signal is effected on a trinary basis, namely, the assumption by the individual blocks of any of three possible different magnetic conditions, which conditions correspond to the conditions shown of blocks 8, 9, and 10 in Fig. 1. The trinary code corresponding to the fifty destinations shown in Fig. 3 will be shown in the table of Fig. 6, where the polarity of one end only of each block is indicated.

Figures 3, 6:
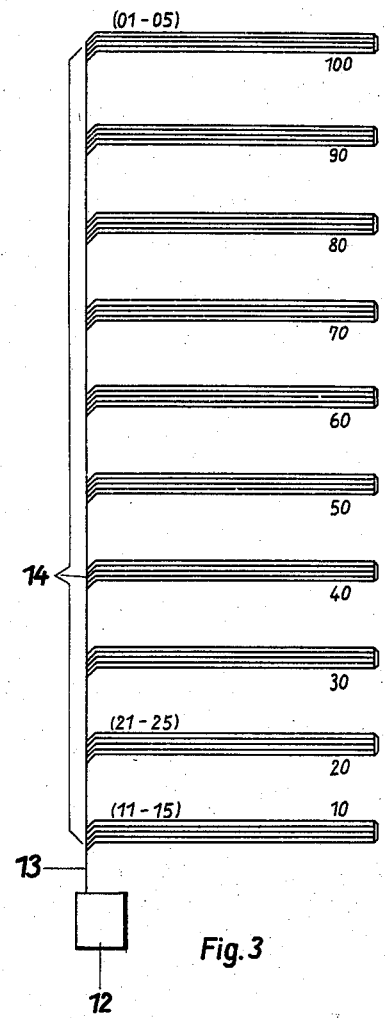
Fig. 3 is a schematic representation of a distribution system as used in this invention.
Fig. 6 shows a table for determining the coding or the destinations schematically shown in Fig. 3.

The application of the magnetic polarities shown in Fig. 6 may be achieved with a plurality of recording devices 7 by the circuit disclosed in Fig. 7b and Fig. 7c. As shown in Fig. 7a, the control station is supplied with a keyboard KB which has two groups of keys represented by the numbers 1 . . . 10 enclosed in separate circles, and the numbers 1 to 5 enclosed in separate circles. The first group of keys relate to the tens digit of a number and the second group to the units digit. The system is so arranged that upon depression of any tens key and any units key the combination represented by the two keys will result in the coding shown in Fig. 6. Fig. 7b shows schematically the operation of two pairs of keys for the coding of the numbers 11 and 45, respectively and corresponding to the destinations 11 and 45 as shown in the right hand column of Fig. 6. Each key is normally adapted to be urged in the upper position by a compression spring S and is adapted to be locked in the operated position by means of the key retaining bar KR, which bar is provided with a slot and a niche for retaining the depressed key. Each key has a pin P1 which extends transverse of the stem of the key and which is adapted to be locked by the niche in the key retaining bar. The key retaining bar is adapted to be moved in the left hand direction to release any depressed key upon actuation of a magnet M.

Further associated with each key are groups of contact springs, which springs are of conventional design and are shown as $1^{I}$ . . . $1^{III}$, etc. The balance of the keys in Fig. 7b are provided with similar contacts which are labelled $A^{I}$, $A^{II}$; $4^{I}$ . . . $4^{IV}$ and $E^{I}$, $E^{II}$. It will be understood that there are further keys not shown, the keys in Fig. 7b relating to the assemblies to be described, namely, the selection of a code corresponding to the destinations numbered 11 and 45, respectively.

As shown in Fig. 7c, there are provided 5 electromagnets EMI . . . EMV and which magnets correspond to the electromagnet 7 shown in Fig. 1. The magnets EMI . . . EMV are disposed along the belt 16 and are spaced from each other a distance equal to the spacing between the blocks I . . . V as shown in Fig. 4. The electromagnets EMI . . . EMV are adapted to be selectively and simultaneously energized in either of two current directions, depending upon the condition of the contacts associated with the keys of the keyboards shown in Fig. 7a. The contacts shown in Fig. 7c correspond to the contacts associated with each of the switches of which four are shown in Fig. 7b.

There will be further noted in Fig. 7c a pair of elements, shown as K1 and K2, and which elements are permanent magnets corresponding to elements 5a, 5b in Fig. 1. The closure of the contact controlled by K1 causes relay K to operate thereby causing closure of contact $K^{I}$. Closure of the element K2 causes the solenoid M to become energized, and, as stated before, the solenoid M controls the key release bar KR. It will be understood, that it requires a finite time for the bar KR to actually release the keys and the time mentioned is sufficient for the energization of the several recording magnets EMI . . . EMV. The depressed keys will thus automatically release to be ready for a subsequent operation when the next destination is to be recorded.

As shown in Fig. 7c, there is a tapped battery BAT which acts as a source of potential for the energization of the said several recording magnets. There is also shown a relay P, which relay has associated therewith, contacts p1, p2, p3 and p4. The purpose of the p contacts is for the reversal of a current applied to the selected recording magnets, as will be apparent from the following detailed description of the mode of operation which will now be explained first in connection with the code signal 11.

Upon actuating the key Z1, Fig. 7b, corresponding to the tens key number 1, Fig. 7a, a circuit path for the recording magnets EMI, EMII and EMV will be prepared via contacts $1^{I}$, $1^{II}$ and $1^{III}$ associated with the I, II and V magnets, respectively. It will be understood, that upon actuation of the key Z1, the key will be locked in actuated position. Upon actuation of the key E1 corresponding to the units key number 1 in Fig. 7a, contacts $A^{I}$, and $A^{II}$ are caused to move to the reverse positions from that shown in Fig. 7c. Thereafter, upon the block 15' passing between the elements K1 and K2, the contact $K^{I}$ applies current from the battery BAT to the I, II, and V electromagnets via the following paths: negative battery $A^{II}$ make, winding of EMI, $A^{I}$ make, contact $k^{I}$ make, contact p3 break, p4 break, positive battery.

The path for EMII may be traced as follows: negative battery $B^{II}$ break, $1^{II}$ make, winding of EMII, $B^{I}$ break, $k1$ make, p3 break, p4 break, positive battery.

The circuit for EMV may be traced as follows: negative battery $E^{II}$ break, $1^{III}$ make, winding of EMV, $E^{I}$ break, $k^{I}$ make, p3 break, p4 break, positive battery.

The code signal formation for the numeral 45 will now be given. This designation will include a current reversal from the battery BAT, as will be apparent from the closure of contact $4^{IV}$ under control of the key Z4 and which contact will cause the relay p to operate and cause break contacts p3 and p4 to open and make contacts p1 and p2 to close. Upon actuation of the keys Z4 and E5, the following paths for the electromagnets $E^{II}$, $E^{III}$, $E^{IV}$, and $E^{V}$ are completed as follows: positive battery $B^{II}$ break, $4^{II}$ make winding of EMII, $B^{I}$ break, $k^{I}$ make, p2 make, p1 make, negative battery.

The path for electromagnet EMIII is as follows: positive battery $C^{II}$ break, $4^{I}$ make, winding of EMIII, $C^{I}$ break, $k^{I}$ make, p2 make, p1 make, negative battery.

The path for coil $EM^{IV}$ is as follows: positive battery, $D^{II}$ break, $4^{III}$ make, winding of EMIV, $D^{I}$ break, $k^{I}$ make, p2 make, p1 make, negative battery.

The path for EMV is as follows: positive battery, $E^{II}$ make, winding of EMV, $E^{I}$ make, $k^{I}$ make, p2 make, p1 make, negative battery.

For detecting the information on the magnetized blocks, an arrangement illustrated in Fig. 8 may be used. Here a plurality of movable magnets 22, two for each of the blocks I to V in the belt 1, are placed on opposite sides of the belt and spaced corresponding to the spacing of the blocks on the belt. Another pair of magnets 23 are positioned on opposite sides of the belt and are spaced to align with the block 15' when the blocks I to V are aligned with the magnets 22. Each pair of these magnets may be provided with the contacts A, B, C and D, E, F, of Fig. 1 for affecting the control circuit 24 which operates the switching devices.

While we have described above the principles of the invention in connection with specific apparatus, it is to be clearly understood that this description is made only by way of example and not as a limitation to the scope of the invention as set forth in the objects thereof and in the accompanying claims.

What is claimed is:

1. A control device for controlling switching functions in a conveyor system, comprising non-magnetic movable conveyor means, a control station, a plurality of magnetic register elements, each mounted on said conveyor means, each element spaced from the other, a plurality of fixed magnetic recording devices adjacent said conveyor means adapted to be in electromagnetic coupling relation with said elements, each spaced from the other a distance equal to the spacing between said elements, means at said control station and connected to said recording devices for altering the electrical condition of selected of said recording devices characteristic of a switching function to be performed, said recording devices adapted to simultaneously magnetize said elements with selective polarity or lack of polarity in accordance with said electrical condition, magnetic detection means adjacent said conveyor means spaced from said recording devices, and under control of said elements, movable and utilization means coupled to and under control of said detection means.

2. A control device as claimed in claim 1, wherein said magnetic detection means comprises a movable permanent magnet in juxtaposition to said conveyor means, said magnet having its poles transverse to the direction of movement of said conveyor means, and said utilization means comprises contacts operated by the movement of said magnet.

3. A control device as claimed in claim 2, wherein said utilization means comprises a fixed and a movable switch contact, said magnet coupled to said movable contact.

4. A control device as claimed in claim 1, wherein said conveyor means comprises a conveyor belt and said magnetic detection means comprises a pair of permanent magnets movably mounted on either side of said belt and in juxtaposition therewith, said magnets in alignment and having their poles transverse to the direction of movement of said belt.

5. A control device as claimed in claim 4, wherein said utilization means comprises two pairs of fixed contacts, and a pair movable contacts, each movable contact adapted to selectively cooperate with a different pair of said fixed contacts, each of said magnets coupled to a different one of said movable contacts, whereby the alignment of said magnets and one of said elements may cause operation of said movable contacts depending upon the magnetic condition of said one element.

6. A control device as claimed in claim 1, wherein said means for altering the electrical condition of said recording device comprises a plurality of keys, a plurality of electrical contacts associated with each of said keys, a source of energizing potential, means for interconnecting said contacts, said recording devices and said source, whereby actuation of any selected pair of said keys determines the application to and direction of flow of current from said source through selected ones of said recording devices.

7. A control device as claimed in claim 6, wherein said means for altering the electrical condition of said recording devices further comprises locking means for locking said keys in actuated position, and electromagnetic release means coupled to and adapted to control release of said locking means, said release means under control of one of said movable contacts and its associated fixed contact.

8. A control device as claimed in claim 6, further comprising potential reversing means coupled to given of said electrical contacts, whereby to alter the electrical polarity of said recording devices depending upon actuation of said given contacts.

9. A control device as claimed in claim 6, further comprising a pair of contacts disposed intermediate said source and said recording devices, said pair of contacts under control of one of said magnets.

10. A control device as claimed in claim 1, wherein said register elements comprise a plurality of magnetic blocks, each mounted transversely across said conveyor means, given of said blocks made of a material adapted to retain a magnetic polarity, different of said blocks made of a non-retentive material.

11. A control device as claimed in claim 10, wherein said blocks are mounted on said conveying means in a plurality of groups, the spacing between groups being greater than the spacing between adjacent elements of a group, each group including at least one block of non-retentive material.

12. A control device as claimed in claim 11, wherein the spacing between said groups of blocks on said conveyor means is of a size sufficient for the physical transport of goods on said conveyor means.

13. A control device for controlling switching functions in a conveyor system comprising movable non-magnetic conveyor means, a control station, a plurality of magnetizable register elements mounted in spaced relation along said conveyor means, an additional soft iron element, mounted on said conveyor means and spaced from said other elements, means at said control station for registering information with respect to a switching direction, a plurality of fixed magnetic recording devices adjacent said conveyor means, corresponding in number to the number of said magnetic register elements and adapted to be in respective electromagnetic coupling with said magnetic register elements when said conveyor means is in a predetermined position, movable magnet means in magnetic coupling relation with said additional element when said conveyor means is in said predetermined position, switch means mechanically connected to said movable magnet means, and means connected to and controlled by said switch means and said registering means for energizing a combination of said recording devices in accordance with the information registered at said control station.

14. A control device, as claimed in claim 13, further comprising means connected to and controlled by the switch means for releasing the information registering means when the combination of recording devices has been energized.

15. A control device, as claimed in claim 13, further comprising a plurality of movable magnet means positioned adjacent said conveyor means at a point removed from the recording elements, there being one such means for each magnetizable register elements and one for said additional element, said magnet means being spaced along the path of said conveyor means to correspond to the spacing of said magnetizable elements and said additional element, a plurality of switch means respectively mechanically connected to said magnet means and respectively operated thereby, and utilization means connected to said switch means and controlled thereby.

References Cited in the file of this patent

UNITED STATES PATENTS

| | | |
|---|---|---|
| 2,120,378 | Tauschek | June 14, 1938 |
| 2,230,279 | Wilcox | Feb. 4, 1941 |
| 2,504,997 | Mason | Apr. 25, 1950 |
| 2,533,326 | Putt | Dec. 12, 1950 |
| 2,657,377 | Gray | Oct. 27, 1953 |
| 2,657,378 | Gray | Oct. 27, 1953 |
| 2,741,757 | Devol et al. | Apr. 10, 1956 |

FOREIGN PATENTS

| | | |
|---|---|---|
| 515,688 | Belgium | May 21, 1953 |
| | (corresponding U. S. 2,784,851, March 12, 1957) | |